(12) United States Patent
Huibers

(10) Patent No.: US 7,265,892 B2
(45) Date of Patent: Sep. 4, 2007

(54) MICROMIRROR ARRAY DEVICES WITH LIGHT BLOCKING AREAS

(75) Inventor: Andrew Huibers, Palo Alto, CA (US)

(73) Assignee: Texas Instruments Incorporated, Dallas, TX (US)

( * ) Notice: Subject to any disclaimer, the term of this patent is extended or adjusted under 35 U.S.C. 154(b) by 114 days.

(21) Appl. No.: 11/120,814

(22) Filed: May 2, 2005

(65) Prior Publication Data

US 2006/0077525 A1 Apr. 13, 2006

Related U.S. Application Data

(63) Continuation-in-part of application No. 10/969,503, filed on Oct. 19, 2004, now Pat. No. 7,158,279.

(51) Int. Cl.
*G02B 26/00* (2006.01)
*G03B 21/26* (2006.01)
*H01L 29/20* (2006.01)
*H01L 21/00* (2006.01)
*H04N 9/31* (2006.01)

(52) U.S. Cl. .................. 359/291; 359/290; 359/295; 359/297; 353/30; 353/99; 257/89; 257/436; 348/771; 438/65; 438/72; 438/73; 438/104; 438/107

(58) Field of Classification Search ................ 359/290, 359/291, 295, 298, 212, 223, 224, 846, 297; 438/65, 66, 72, 73, 104, 107; 257/89, 436, 257/443; 348/771; 353/32, 35, 99, 30
See application file for complete search history.

(56) References Cited

U.S. PATENT DOCUMENTS

| | | | |
|---|---|---|---|
| 4,383,255 A | 5/1983 | Grandjean et al. | |
| 4,564,836 A | 1/1986 | Vuilleumier et al. | |
| 5,719,695 A | 2/1998 | Heimbuch | |
| 5,835,256 A | 11/1998 | Huibers | |
| 6,046,840 A | 4/2000 | Huibers | |
| 6,071,616 A | 6/2000 | Sulzbach et al. | |
| 6,282,010 B1 | 8/2001 | Sulzbach et al. | |
| 6,288,824 B1 * | 9/2001 | Kastalsky | 359/254 |
| 6,741,377 B2 * | 5/2004 | Miles | 359/243 |
| 6,844,959 B2 | 1/2005 | Huibers et al. | |
| 6,873,450 B2 * | 3/2005 | Patel et al. | 359/291 |
| 6,906,847 B2 | 6/2005 | Huibers | |
| 7,019,376 B2 * | 3/2006 | Patel et al. | 257/436 |
| 7,113,322 B2 * | 9/2006 | Patel | 359/291 |
| 2002/0056900 A1 | 5/2002 | Liu et al. | |
| 2002/0109903 A1 | 8/2002 | Kaeriyama | |

FOREIGN PATENT DOCUMENTS

EP 0069226 A2 3/1986

OTHER PUBLICATIONS

Cadman, New Micromechanical Display Using Thin Metallic Films, IEEE Electron Device Letters vol. EDL-4, No. 1, Jan. 1983.
Colgan, Optimazation of Light-Valve Mirrors, 1996 SID International Symposium—Digest of Technical Papers, vol. 29; Anaheim, CA; May 1998, pp. 1071-1074.
Melcher, High Information Content Projection Display Based on Reflective LC on Silicon Light Valves, 1998 SID International Symposium—Digest of Technical Papers, vol. 29; Anaheim, CA May 1998, pp. 25-28.

* cited by examiner

*Primary Examiner*—Loha Ben
(74) *Attorney, Agent, or Firm*—Charles A. Brill; Wade James Brady, III; Frederick J. Telecky, Jr.

(57) ABSTRACT

Disclosed herein is a micromirror array device package having a light blocking area for reducing unexpected light scattering from the surfaces of the posts.

58 Claims, 11 Drawing Sheets

MICROMIRROR ARRAY DEVICES WITH LIGHT BLOCKING AREAS

CROSS-REFERENCE TO RELATED PATENT APPLICATIONS

This patent application is a continuation-in-part of U.S. patent application Ser. No. 10/969,503 filed Oct. 19, 2004, now U.S. Pat. No. 7,158,279 the subject matter being incorporated herein by reference in its entirety.

TECHNICAL FIELD OF THE INVENTION

The present invention is generally related to the art of micromirror array devices, and more particularly, to the micromirror array devices with light blocking areas for reducing unwanted light scattering.

BACKGROUND OF THE INVENTION

Projection display systems employing spatial light modulators, as well as many other image-reproducing systems, prefer only image-data encoded light to be projected on the viewing screens so as to obtain the desired images or videos of pleasant display quality. Non-image data encoded light, such as ambient light and light scattered from the members of the micromirror array devices can degrade the display quality if projected also on the viewing screen and superpositioned with the image-data encoded light. In particular, such superposition may significantly decrease the contrast ratio of the displayed image.

Contrast ratio is the ratio of luminance between the brightest white that can be produced and the darkest black that can be produced. If a display image has a higher contrast ratio, a viewer will judge it to be sharper than a displayed image with a lower contrast ratio, even if the lower contrast image has substantially more measurable resolution.

Therefore, a method and apparatus for avoiding reduction of the contrast ratio due to unexpected light scattering from the functional members of the micromirror array devices are desired.

SUMMARY OF THE INVENTION

In view of the foregoing, the present invention teaches a micromirror array device having a light blocking provided for reducing light scattering from the posts of the micromirror array devices.

In an embodiment of the invention, a light blocking pad is provided for a post of the micromirror array device. Such light blocking pad can be a light absorbing film that absorbs 90% or more, or preferably 99% or more of the light incident thereto. Alternatively, the light blocking pad can be a light reflective film that reflects 90% or more, or preferably 99% or more of the light incident thereto. As an aspect of the embodiment, the light blocking pad is preferably formed such that the incident light is directed towards a corner of the pad. As another aspect of the embodiment, the shape of the pad can be independent of the shape of the exposed area of the posts, but preferably covers the entire exposed area of the posts—that is, the post may have no edges parallel to the edges of the post. In relation to the micromirror array, the light blocking pad may have no edges parallel to the edges of the micromirror array either. However, the light blocking area may be formed such that the pad comprises an edge that is parallel to an edge of the post or the mirror plate that is held by the post, or is parallel to an edge of the micromirror array.

In an exemplary fabrication, the micromirror array device can be formed by providing a substrate and depositing a first sacrificial layer on the substrate. The sacrificial layer is then patterned followed by depositing and patterning of an array of mirror plates. The second sacrificial layer is then deposited and patterned followed by a process of forming the hinge contact, posts, and light blocking areas as appropriate such that each post has a light blocking area disposed between a surface of the post and the substrate.

In another exemplary fabrication process, an array of light blocking pads can be formed on the substrate before depositing the first sacrificial layer and the subsequent fabrication processes for the other fabrication layers of the micromirror array devices.

The objects and advantages of the present invention will be obvious, and in part appear hereafter and are accomplished by the present invention. Such objects of the invention are achieved in the features of the independent claims attached hereto. Preferred embodiments are characterized in the dependent claims.

BRIEF DESCRIPTION OF THE DRAWINGS

The accompanying drawings are illustrative and are not to scale. In addition, some elements are omitted from the drawings to more clearly illustrate the embodiments. While the appended claims set forth the features of the present invention with particularity, the invention, together with its objects and advantages, may be best understood from the following detailed description taken in conjunction with the accompanying drawings, in which:

DETAILED DESCRIPTION OF THE DRAWINGS

The present invention discloses a micromirror array device having a light blocking area for reducing unexpected light scattering. In the following, the present invention will be discussed with reference to selected examples from many possible variations thereof. It will be immediately understood by those skilled in the art that the following discussion is for demonstration purposes only, and should not be interpreted as a limitation.

Figure 1:
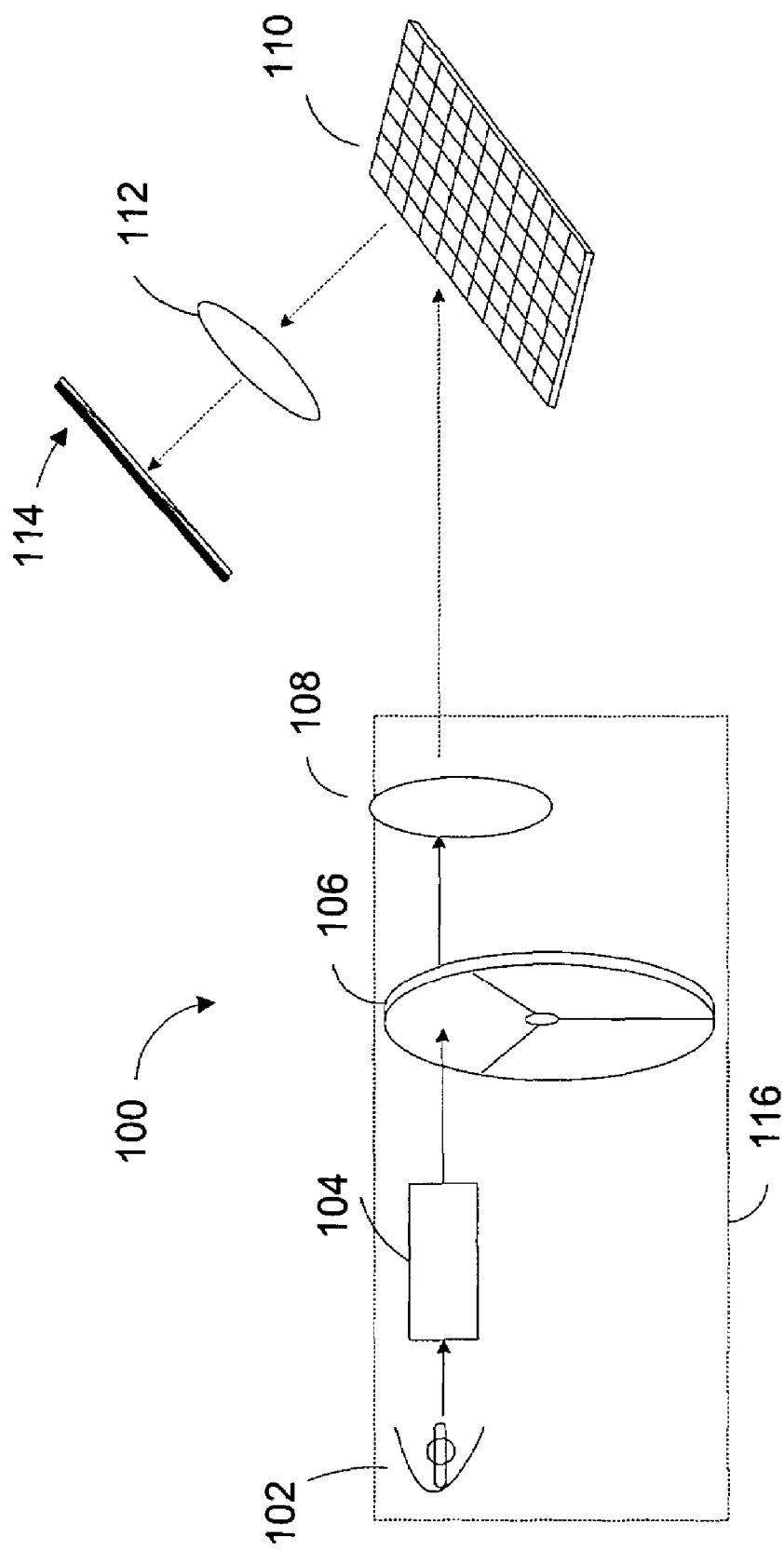
FIG. 1 illustrates an exemplary display system employing a spatial light modulator in which embodiment of the invention can be implemented.

Turning to the drawings, FIG. 1 schematically illustrates an exemplary display system that employs a spatial light modulator in which embodiment of the invention can be implemented. In this particular example, display system 100 comprises light source illumination system 116, group lens 108, spatial light modulator 110, projection lens 112, and display target 114. The illumination system may further comprise light source 102, light pipe 104, and color filter 106 such as a color wheel. Alternative to the illumination system 116 as shown in the figure wherein the color wheel is positioned after the light pipe along the propagation path of the illumination light from the light source, the color wheel can also be positioned between the light source and light pipe at the propagation path of the illumination light. The illumination light can be polarized or non-polarized. When polarized illumination light is used, display target 114 may comprise a polarization filter associated with the polarized illumination light, as set forth in U.S. provisional patent application Ser. No. 60/577,422 filed Jun. 4, 2004, the subject matter being incorporated herein by reference.

The light source can be any suitable light source, such as an arc lamp, preferably an arc lamp with a short arc for obtaining intensive illumination light. The light source can also be an arc lamp with a spiral reflector, as set forth in U.S. patent application Ser. No. 11/055,654 filed Feb. 9, 2005, the subject matter being incorporated herein by reference.

The lightpipe (104) can be a standard lightpipe that are widely used in digital display systems for delivering homogenized light from the light source to spatial light modulators. Alternatively, the lightpipe can be the one with movable reflective surfaces, as set forth in U.S. patent provisional application Ser. No. 60/620,395 filed Oct. 19, 2004, the subject matter being incorporated herein by reference.

The color wheel (106) comprises a set of color and/or white segments, such as red, green, blue, or yellow, cyan, and magenta. The color wheel may further comprise a clear or non-clear segment, such as a high throughput or white segment for achieving particular purposes, as set forth in U.S. patent application Ser. No. 10/899,637, and Ser. No. 10/899,635 both filed Jul. 26, 2004, the subject matter of each being incorporated herein by reference, which will not be discussed in detail herein.

Figure 2:
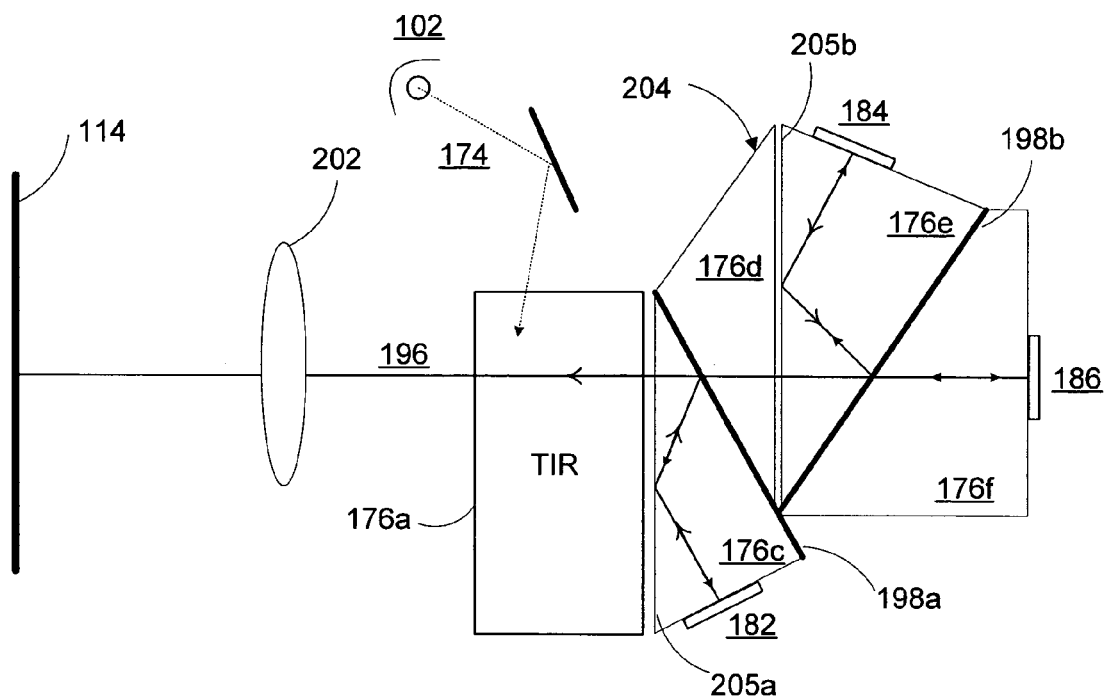
FIG. 2 illustrates another exemplary display system employing more than one spatial light modulators in each of which embodiment of the invention can be implemented.

The display system in FIG. 1 employs one spatial light modulator. However, a display system may use multiple spatial light modulators for modulating the illumination light of different colors. One of such display systems is schematically illustrated in FIG. 2. Referring to FIG. 2, the display system uses a dichroic prism assembly 204 for splitting incident light into three primary color light beams. Dichroic prism assembly comprises TIR 176a, 176c, 176d, 176e and 176f. Totally-internally-reflection (TIR) surfaces, i.e. TIR surfaces 205a and 205b, are defined at the prism surfaces that face air gaps. The surfaces 198a and 198b of prisms 176c and 176e are coated with dichroic films, yielding dichroic surfaces. In particular, dichroic surface 198a reflects green light and transmits other light. Dichroic surface 198b reflects red light and transmits other light. The three spatial light modulators, 182, 184 and 186, each having a micromirror array device, are arranged around the prism assembly.

In operation, incident white light 174 from light source 102 enters into TIR 176a and is directed towards spatial light modulator 186, which is designated for modulating the blue light component of the incident white light. At the dichroic surface 198a, the green light component of the totally internally reflected light from TIR surface 205a is separated therefrom and reflected towards spatial light modulator 182, which is designated for modulating green light. As seen, the separated green light may experience TIR by TIR surface 205b in order to illuminate spatial light modulator 182 at a desired angle. This can be accomplished by arranging the incident angle of the separated green light onto TIR surface 205b larger than the critical TIR angle of TIR surface 205b. The rest of the light components, other than the green light, of the reflected light from the TIR surface 205a pass through dichroic surface 198a and are reflected at dichroic surface 198b. Because dichroic surface 198b is designated for reflecting red light component, the red light component of the incident light onto dichroic surface 198b is thus separated and reflected onto spatial light modulator 184, which is designated for modulating red light. Finally, the blue component of the white incident light (white light 174) reaches spatial light modulator 186 and is modulated thereby. By collaborating operations of the three spatial light modulators, red, green, and blue lights can be properly modulated. The modulated red, green, and blue lights are recollected and delivered onto display target 114 through optic elements, such as projection lens 202, if necessary.

Figure 3:
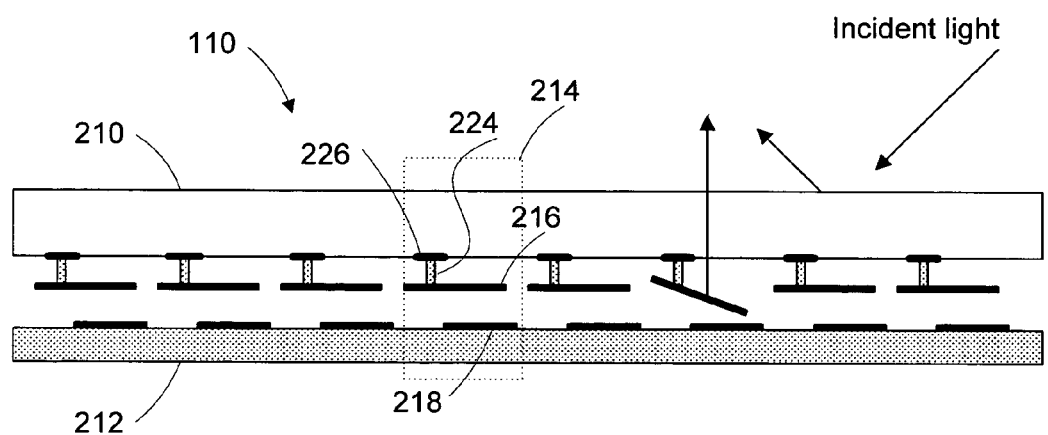
FIG. 3 is a cross-sectional view of an exemplary spatial light modulator usable for the display systems in FIG. 1 and FIG. 2.

The spatial light modulators of the display systems in FIG. 1 and FIG. 2 each comprise a micromirror array device having an array of reflective deflectable mirror plates. An example of such spatial light modulators is illustrated in a cross-sectional view in FIG. 3. Referring to FIG. 3, spatial light modulator comprises light transmissive substrate 210 and semiconductor substrate 212. The two substrates together form a gap therebetween in which an array of reflective deflectable mirror plates (e.g. mirror plate 216 of micromirror device 214) are disposed. For individually addressing and deflecting the mirror plates, an array of addressing electrodes (e.g. addressing electrode 218 of micromirror device 214) is disposed proximate to the mirror plates.

The reflective deflectable mirror plates are disposed within the gap between substrates 210 and 212, and can be formed on either one of the substrates. In the above example, substrate 210 is a light transmissive substrate such as glass, quartz, or sapphire, and substrate 212 is a standard semiconductor silicon substrate on which standard integrated circuits can be fabricated. The mirror plates are formed on the light transmissive substrate. Specifically, each mirror plate such as mirror plate 216 is connected to and thus held on substrate 210 by a post (e.g. post 224). Alternatively, the mirror plates can be formed on the same substrate as the addressing electrodes, such as substrate 212. In this instance, an array of posts are formed on substrate 212 with each of the posts connecting one of the mirror plate to substrate 212, which is not shown in the figure. In yet another example, the mirror plates can be derived from a single crystal, such as single crystal silicon, and are connected to substrate 212 via posts that are formed on substrate 212, as set forth in U.S. patent application Ser. No. 11/056,732, Ser. No. 11/056,727, now U.S. Pat. No. 7,119,944 and Ser. No. 11/056,752, all filed on Feb. 11, 2005, the subject matter of each being incorporate herein by reference. When the mirror plates are connected to substrate 212 via the posts formed on substrate 212, substrate 210 may or may not be necessary.

Figure 4:
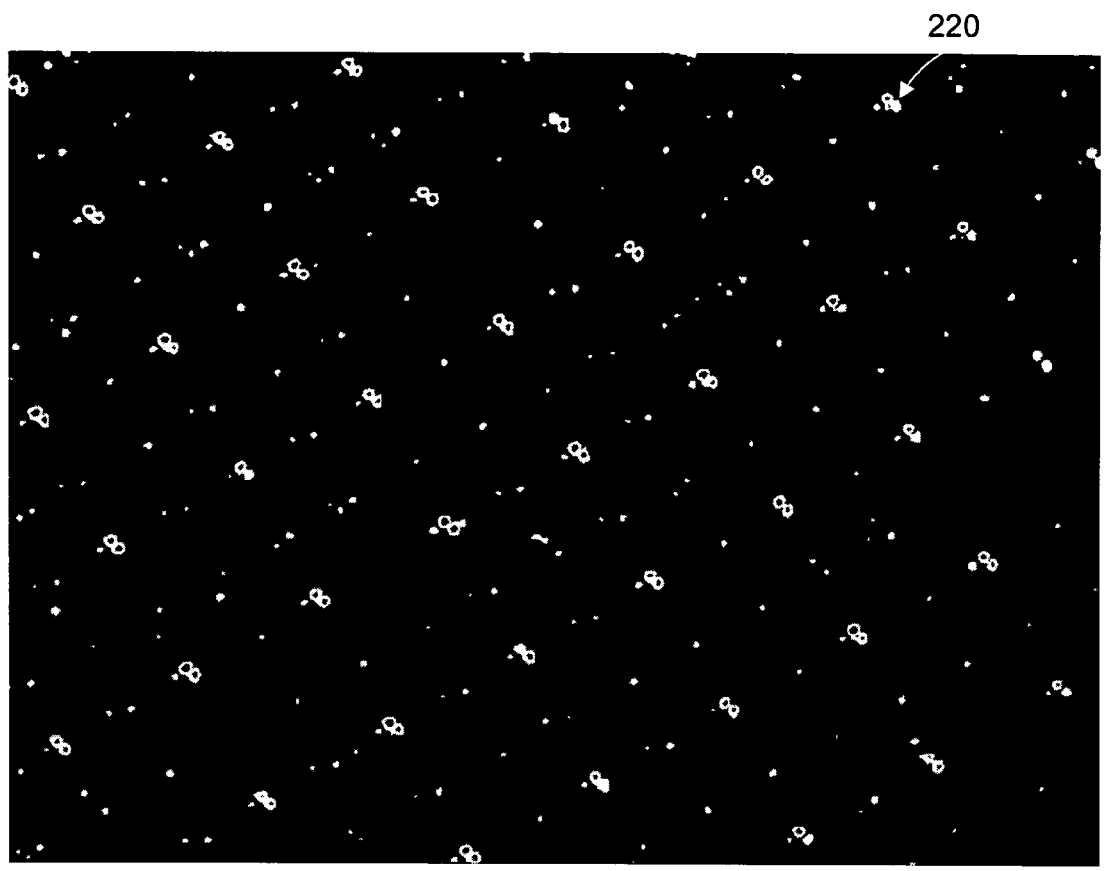
FIG. 4 schematically illustrates a photo of the micromirror array device without the light blocking pads of the invention.

In operation a portion of the posts, especially when the posts are formed on the light transmissive substrate 210, a portion of the posts is exposed to the incident light. A disadvantage of such exposure is unexpected light scattering of the incident light from the exposed portion of the posts. In the example as shown in FIG. 3, the top surface of each post contacting substrate 210 is exposed to the incident light, which results in light scattering. The scattered light superposes with the displayed image on the viewing screen, resulting in unpleasant viewing effects. An exemplary illumination pattern generated by the scattered light is schematically illustrated in FIG. 4. Referring to FIG. 4, open circles, such as open circles 220 are images of the exposed areas of the posts and are generated by the scattered light. Dark spots are images of other exposed portions of the micromirror devices, such as the mirror plate corners. Such illumination pattern overlaps with the displayed image and degrades the image quality of the displayed image.

An approach to solve this problem is providing light blocking pads to cover the exposed areas of the posts, such as light blocking pad 226 in mirror device 214 shown in FIG. 3. In the example shown in the figure wherein the posts are formed on the light transmissive substrate 210, a light blocking pad is disposed between each post and substrate 210 so as to reduce the light scattering from the exposed area of the post.

The light blocking pads can be in any suitable shapes but each preferably covers the entire exposed area of the posts— that is, the shapes of the light blocking pads may or may not be configured independently from the shapes of the exposed areas of the posts. The light blocking pads, however, may also introduce unpleasant light scattering. For this reason, the light blocking pads each can be shaped such that the illumination light to be modulated by the micromirror array device is directed towards a corner of the light blocking pad. More preferably, no edge of the light blocking pad is perpendicular to the propagation path of the illumination light, as shown in FIGS. 5a and 5b.

Figure 5A:
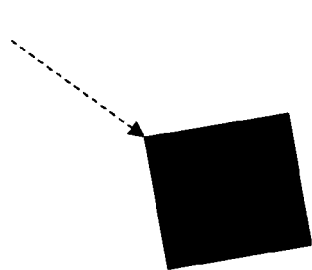
FIG. 5a and FIG. 5b demonstratively illustrate examples of positioning a light blocking pad in relation to the incident light.
Figure 5B:
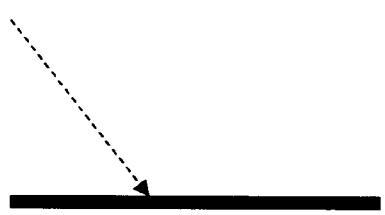

Referring to FIG. 5a, the light blocking pad can be square in shape. The illumination impinges the light blocking pad at a corner of the light blocking pad when viewed from the above of the light blocking pad. The illumination light is neither parallel nor perpendicular to any edge of the square shaped light blocking pad. In a side view as shown in FIG. 5b, the incident light illuminates the light blocking pad at an angle to the surface of the light blocking pad.

Figure 6:
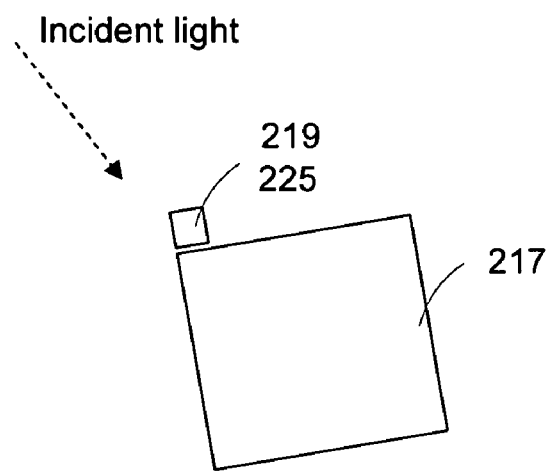
FIG. 6 demonstratively illustrates examples of positioning a light blocking pad in relation to the post, mirror plate and micromirror array.

The light blocking pads can be configured independently from the mirror plates or the micromirror array. However, because the direction of the illumination light is preferably towards the corners of the mirror plates so as to reduce the light scattering from the edges of the mirror plates; and so as for the light blocking pads as discussed above with reference to FIG. 5a and FIG. 5b, the light blocking pad and mirror plate can be aligned to each other. An example of such configuration is shown in FIG. 6. Referring to FIG. 6, post 219 is disposed at a corner of mirror plate 217 for supporting the mirror plate on a substrate (not shown in the figure). The exposed surface of the post is covered by light blocking pad 225 (superposed on the exposed surface of the post) so as to reduce the light scattering therefrom. The incident light is directed towards a corner of the mirror plate and corner of the light blocking pad. The incident light is neither parallel nor perpendicular to any one of the edges of the mirror plate and light blocking pad.

Though it is preferred that the exposed area of each post be provided with a light blocking pad to reduce the light scattering therefrom, this is not an absolute requirement. For example, some of the exposed areas of the posts may be covered with light blocking pads, while one or more of the exposed areas are not. This becomes important especially when the light blocking pads are regularly repeated across the entire micromirror array and generate an image of the regular disposure on the viewing screen.

The light blocking pad may comprise a light absorbing material that absorbs 85% or more, or 90% or more, or 99% or more of the illumination light incident thereto. Alternatively, the light blocking pad may be composed of a light reflective material that reflects 85% or more, or 90% or more, or 99% or more of the illumination light incident thereto. The light blocking pads each can be a single layer or a multilayered structure. The light absorbing material is preferably one that absorbs wavelengths of broad range in the visible spectrum. An opaque material, preferably a black material, is preferred. More specifically, the non-reflective material can be a dark, opaque (e.g. black, grey, or other dark colors) thin film. In particular, the light absorbing material comprises Chromium or chromium oxide Other suitable materials, such as black nickel, $CrN_x$, $TiAl_x$, $TaN_x$, and materials containing carbon, such as amorphous $CN_x$, amorphous $CAlN_y$, $CTi_xN_y$, a-DLC, vitreous carbon, SiC, TiAlCN, WC, etc, are also applicable. Multilayer structures, such as TiC/WC, WC/C or TiAln/WC/C, can be used, as well as other multilayer structures with matched indices. Also, polymides and other polymers containing carbon black (or other opacity increasing material) can be used. If the light absorbing layer is exposed to an etchant at the time of release of the micromirrors, the light absorbing material should preferably be resistant to the etchant used. Of course, other opaque films (preferably those with high optical density, thermally stable and with low reflectivity) can be used.

The light absorbing material can be deposited as a thin film using suitable standard thin film deposition techniques, such as electroplating, PVD, CVD, PECVD, sputtering, and CMP (chemical mechanical polarization). The light absorbing thin film may have a thickness in an order of microns or less, such as 100 microns or less, 50 microns or less, 10 microns or less, or several microns or even less.

Figure 7:
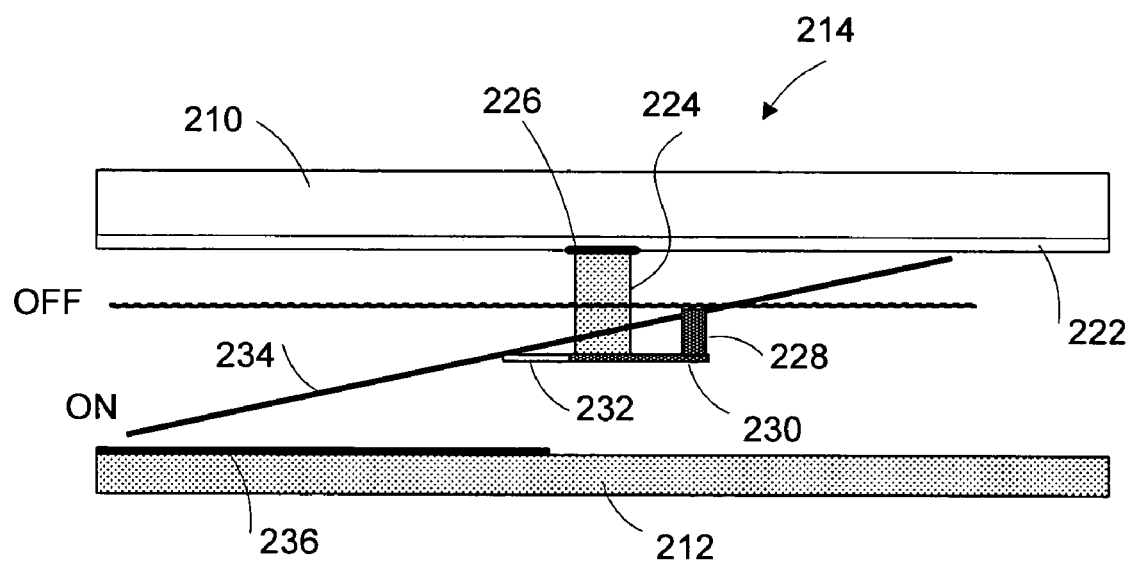
FIG. 7 illustrates a micromirror device of the micromirror array device of FIG. 3.

As a way of example, a cross-sectional view of a micromirror device having a light blocking pad on the post of the micromirror device is illustrated in FIG. 7. Referring to FIG. 7, substrate 210 is a light transmissive substrate, and substrate 212 is a standard semiconductor substrate such as a silicon substrate. Post 224 is formed on substrate 210 with light blocking pad 226 being disposed therebetween. Hinge support 230 is connected to and thus held by post 224. A deformable hinge is affixed to the hinge support. Reflective deflectable mirror plate 234 is attached to the deformable hinge via hinge contact 228 such that the mirror plate is capable of rotating relative substrate 210, such as to the ON and OFF state as shown in the figure. Such rotation is accomplished through addressing electrode 236 formed on substrate 212 and disposed proximate to the mirror plate. For effectively addressing and deflecting the mirror plate electrostatically, the addressing electrode is preferably disposed beyond the area of the mirror plate, as set forth in U.S. patent application Ser. No. 10/947,005 filed Sep. 21, 2004, now U.S. Pat. No. 7,113,322 the subject matter being incorporated herein by reference.

In one embodiment of the invention, the mirror plate is associated with only one addressing electrode (e.g. addressing electrode 236). Alternatively, another electrode, such as electrode 222 can be provided for rotating the mirror plate towards substrate 210. Because electrode 222 is formed on light transmissive substrate 210, it is preferred that electrode 222 is electrically conductive and is transmissive to the incident light. An example of such electrode can be a thin film of indium-tin-oxide. Electrode 222 can also be a multi-layered structure. For example, electrode 222 may comprise an electrically conductive layer and electrically non-conductive layer with the electrically conductive layer being sandwiched between substrate 210 and the electrically non-conductive layer. This configuration prevents potential electrical short between the mirror plate and electrode 222. The electrically non-conductive layer can be $SiO_x$, $TiO_x$, $SiN_x$, and $NbO_x$, as set forth in U.S. patent application Ser. No. 11/102,531 filed Apr. 8, 2005, the subject matter being incorporated herein by reference. In other embodiments of the invention, multiple addressing electrodes can be provided for the micromirror device, as set forth in U.S. patent application Ser. No. 10/437,776 filed May 13, 2003, now U.S. Pat. No. 7, 099,065 and Ser. No. 10/947,005 filed Sep. 21, 2004, the subject matter of each being incorporated herein by reference in entirety.

Stopper 232 can provided as an alternative feature to limit the rotation of the mirror plate in accordance with the operation states, such as the ON state when the micromirror is operated in a binary mode including the ON and OFF state. The stopper can be formed in many alternative ways, such as those set forth in U.S. patent application Ser. No. 10/437,776 filed Apr. 13, 2003 and Ser. No. 10/613,379 filed Jul. 3, 2003, now U.S. Pat. No. 6,873,450 Ser. No. 10/703, 678 filed Nov. 7, 2003, now U.S. Pat. No. 6,876,485 the subject matter of each being incorporated herein by reference.

Another alternative feature that can be included in the micromirror device is optical coatings on the light transmissive substrate 210 for adjusting the optical properties of the light transmissive substrate. For example, an anti-reflection layer can be formed on a surface of the light transmissive substrate 210 for enhancing the transmission of the illumination light. Such optical coating can be a single or a multilayered structure. When the optical coating is used along with the electrically conductive layer as discussed above, optical indices of the electrically conductive and electrically non-conductive layers, as well as the optical indices of the optical coating layers can be optimized so as to achieve optimum effect in both electrical and optical properties. As an example, the multiple layers of electrode 222 in FIG. 7 and the optical coating can be arranged such that the electrically conductive layer is isolated from the mirror plate by an electrically non-conductive layer, and the laminate combination of all layers results in a gradient of optical indices from the surface of the light transmissive substrate to the outmost layer of the laminate combination layers. An exemplary of such laminate combination incorporating both electrical and optical properties can be a $SiO_x$-ITO (indium-tin-oxide)-$SiO_x$-$TiO_x$/$NbO_x$ film group.

The micromirror device as show in FIG. 7 is only one example of many applicable examples of the invention. For example, in the example as shown in FIG. 7 the mirror plate is attached to the deformable hinge such that the mirror plate rotates asymmetrically. That is the maximum rotation angle (e.g. the ON state angle) achievable by the mirror plate rotating in one direction (the direction towards the ON state) is larger than that (e.g. the OFF stat angle) in the opposite rotation direction (e.g. the direction towards the OFF state). This is accomplished by attaching the mirror plate to the deformable hinge at a location that is not at the center of the mirror plate such that the rotation axis of the mirror plate is offset from a diagonal of the mirror plate. However, the rotation axis may or may not be parallel to the diagonal. Of course, the mirror plate can be attached to the deformable hinge such that the mirror plate rotates symmetrically. That is the maximum angle achievable by rotating the mirror plate is substantially the same as that in the opposite rotation direction.

The mirror plate of the micromirror shown in FIG. 7 can be attached to the deformable hinge such that the mirror plate and deformable hinge are in the same plane. In an alternative embodiment of the invention, the deformable hinge can be located in a separate plane as the mirror plate when viewed from the top of the mirror plate at a non-deflected state, which will not be discussed in detail herein.

In the following, selected exemplary micromirror devices having the cross-sectional view of FIG. 7 will be discussed with reference to FIG. 8 to FIG. 11. It will be immediately understood by those skilled in the art that the following discussion is for demonstration purposes only and is not intended to be limiting. Instead, any variations without departing from the spirit of the invention are also applicable.

Figure 8:
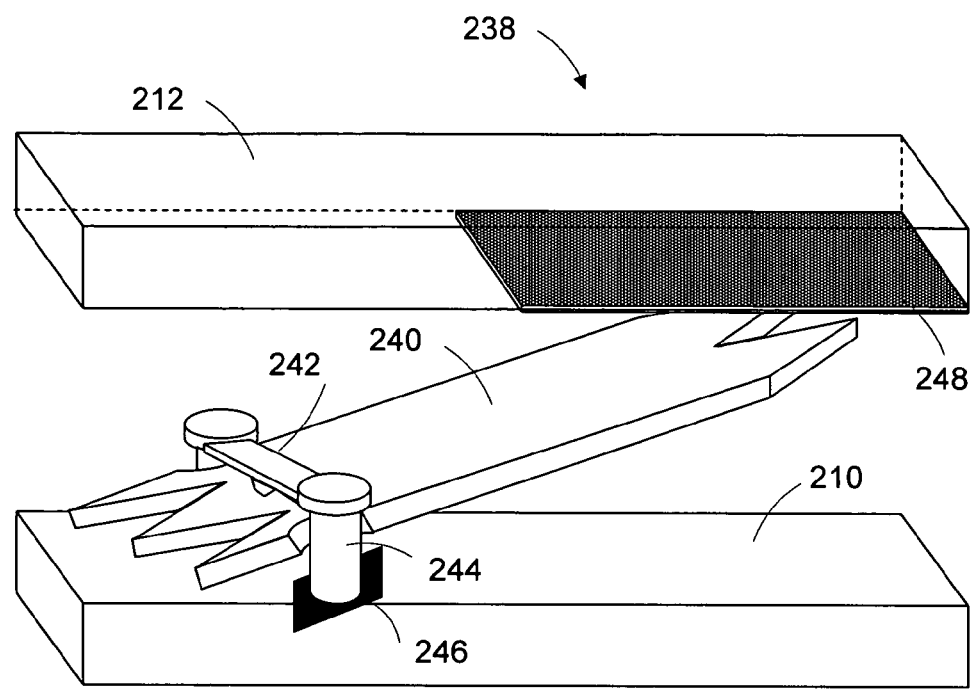
FIG. 8 illustrates an exemplary micromirror device according an embodiment of the invention.

Referring to FIG. 8, a perspective view of an exemplary micromirror device in which embodiments of the invention are applicable is illustrated therein. Micromirror device 238 comprises substrate 210 that is a light transmissive substrate such as glass, quartz, and sapphire and semiconductor substrate 182, such as silicon substrate. Deflectable and reflective mirror plate 240 is spaced apart and attached to deformable hinge 242 via a hinge contact. The deformable hinge is affixed to and held by posts 244. The semiconductor substrate has addressing electrode 248 for deflecting the mirror plate. Light blocking pad 246 is formed between the surface of post 244 and substrate 210 for reducing unexpected light scattering from the exposed surface of the posts.

Figure 9:
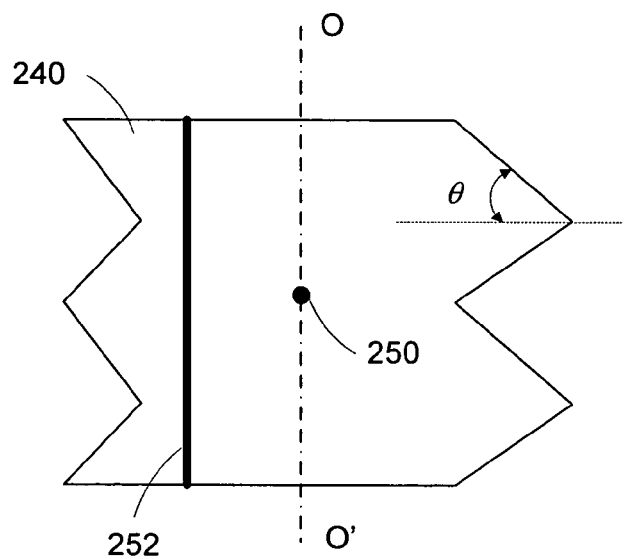
FIG. 9 illustrates a top view of the reflective and deflectable mirror plate in relation to the rotation axis of the micromirror device in FIG. 8.

A top view of the micromirror in FIG. 8 is illustrated in FIG. 9. As can be seen in FIG. 9, deformable hinge 252 is not along but offset from the symmetrical axis OO' of the mirror plate such that the mirror plate is operable to rotate asymmetrically. The deformable hinge is located beneath the mirror plate in the direction of the incident light. That is, the mirror plate is located between the light transmissive substrate and the deformable hinge such that the deformable hinge is not illuminated by the incident light so as to prevent unexpected light scattering from the deformable hinge, thereby, increasing the contrast ratio of the produced image. The quality of the produced image is further improved through reduction of the light scattering from the edges of the mirror plate by forming the edges of the mirror plate into a zigzag shape, as shown in the figure.

The deflectable and reflective mirror plate can be a multilayered structure. For example, the mirror plate may comprise an electrical conducting layer, a reflective layer that is capable of reflecting 85% or more, or 90% or more, or 85% or more, or 99% or more of the incident light (e.g. incident visible light), a mechanical enhancing layer that enhances the mechanical properties of the mirror plate. An exemplary mirror plate can be a multilayered structure comprising a $SiO_2$ layer, an aluminum layer, a titanium layer, and a titanium nitride layer. When aluminum is used for the mirror plate; and amorphous silicon is used as the sacrificial material, diffusion between the aluminum layer and the sacrificial material may occur. This can be avoided by depositing a barrier layer therebetween.

Figure 10:
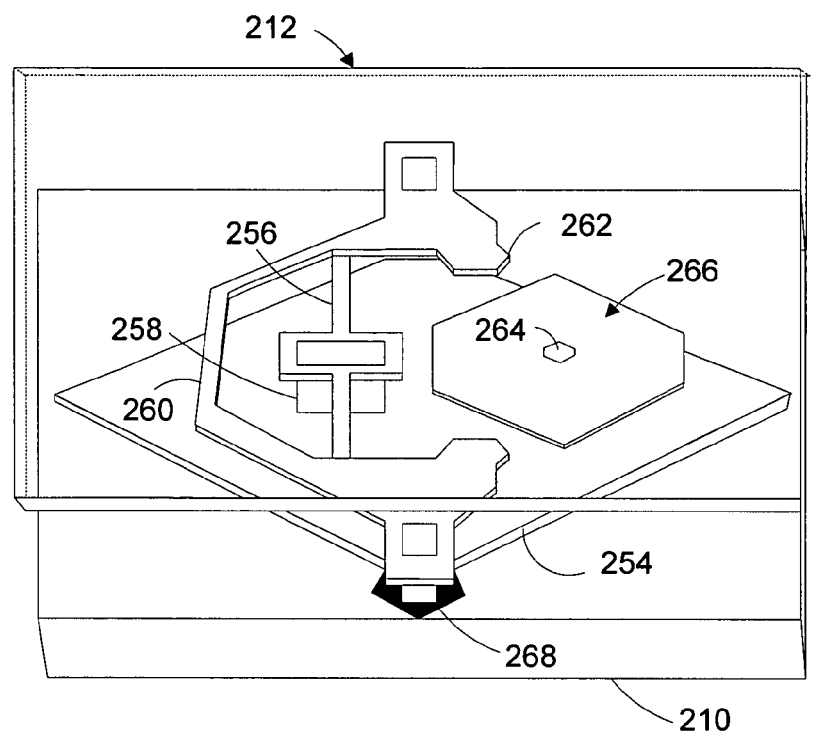
FIG. 10 illustrates another exemplary micromirror device according an embodiment of the invention.

Another exemplary micromirror device having a cross-sectional view of FIG. 7 is illustrated in its perspective view in FIG. 10. Referring to FIG. 10, deflectable reflective mirror plate 254 with a substantially square shape is formed on light transmissive substrate 210, and is attached to deformable hinge 256 via hinge contact 258. The deformable hinge is held by hinge support 260, and the hinge support is affixed and held by posts on the light transmissive substrate. For electrostatically deflecting the mirror plate, an addressing electrode (not shown in the figure for simplicity purposes) is fabricated in the semiconductor substrate 212. For improving the electrical coupling of the deflectable mirror plate to the electrostatic field, extending metallic plate 266 can be formed on the mirror plate and contacted to the mirror plate via post 264. Light blocking pad 268 is disposed between the surface of the post and substrate 210 so as to reduce unexpected light scattering from the post. The light blocking pad can also be deployed in a way so as to block light scattered from other portions of the micromirror, such as the tips (or the corners) of the mirror plate of the micromirror, and the exterior surfaces (e.g. the walls) of the posts.

Figure 11:
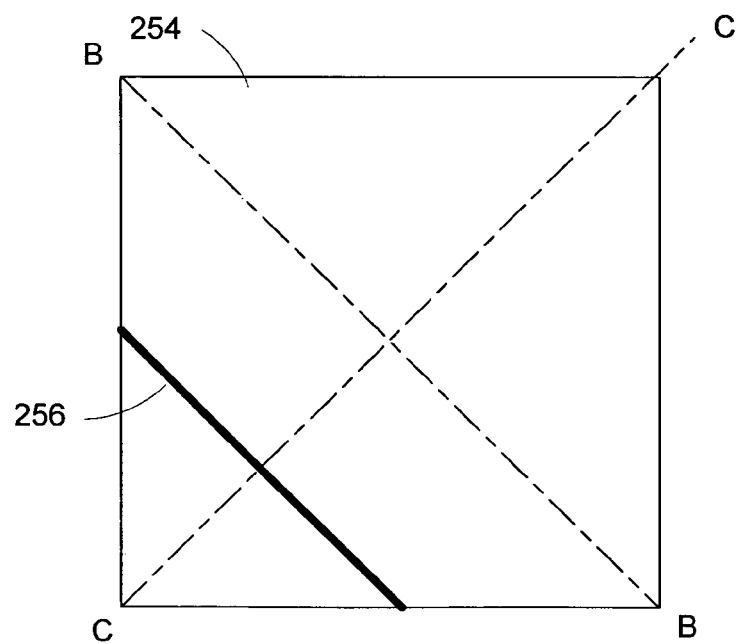
FIG. 11 illustrates a top view of the reflective and deflectable mirror plate in relation to the rotation axis of the micromirror device in FIG. 10.

The mirror plate is preferably attached to the deformable hinge asymmetrically such that the mirror plate can be rotated asymmetrically for achieving high contrast ratio. The asymmetric attachment is better illustrated in FIG. 11. Referring to FIG. 11, mirror plate comprises diagonals BB and CC. Deformable hinge is disposed with its length parallel to a diagonal (e.g. BB) of the mirror plate. However, the length of the deformable is not along any diagonal of the mirror plate in the top view when the mirror plate is parallel to the light transmissive substrate. Of course, the mirror plate can be attached to the deformable hinge symmetrically by placing the attachment point around the geometric or mass center of the mirror plate, which will not be discussed in detail herein.

Similar to that shown in FIG. 8, the deformable hinge is preferably formed beneath the deflectable mirror plate in the direction of the incident light so as to avoid unexpected light scattering by the deformable hinge. For reducing unexpected light scattering of the mirror plate edge, the illumination light is preferably incident onto the mirror plate along a corner of the mirror plate.

Figure 12:
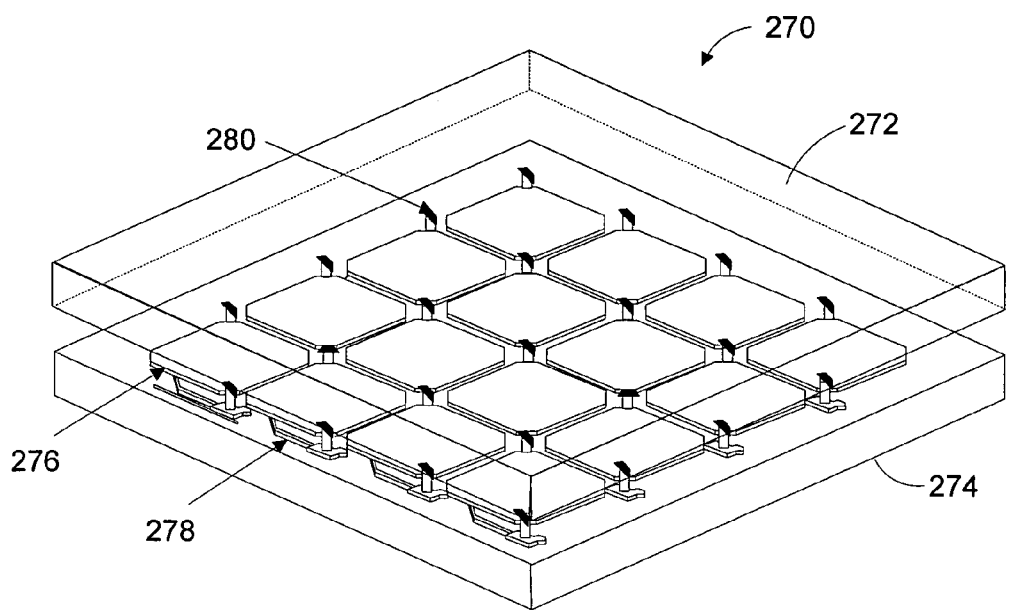
FIG. 12 illustrates a perspective view of an exemplary spatial light modulator according to an embodiment of the invention.

Referring to FIG. 12, an exemplary spatial light modulator having an array of micromirrors of FIG. 10 is illustrated therein. For simplicity purposes, only 4×4 micromirrors are presented. In general, the micromirror array of a spatial light modulator consists of thousands or millions of micromirrors, the total number of which determines the resolution of the displayed images. For example, the micromirror array of the spatial light modulator may have 1024×768, 1280×720, 1400×1050, 1600×1200, 1920×1080, or even larger number of micromirrors. In other applications, the micromirror array may have less number of micromirrors.

In this example, the array of deflectable reflective mirror plates 276 is disposed between light transmissive substrate 272 and semiconductor substrate 274 having formed thereon an array of addressing electrodes 278 each of which is associated with a mirror plate for electrostatically deflecting the mirror plate. The posts of the micromirrors are covered by light blocking pads 280 for reducing expected light scattering from the surfaces of the posts.

In operation, the illumination light passes through the light transmissive substrate and illuminates the reflective surfaces of the mirror plates, from which the illumination light is modulated. The illumination light incident onto the areas corresponding to the surfaces of the posts are blocked (e.g. reflected or absorbed depending upon the materials of the light blocking pads) by the light blocking pads. The reflected illumination light from the mirror plates at the ON state is collected by the projection lens (e.g. projection lens 112 in FIG. 1) so as to generate a "bright" pixel in the display target (e.g. display target 114 in FIG. 1). The reflected illumination from the mirror plates at the OFF state travels away from the projection lens, resulting in the corresponding pixels imagined at the display target to be "dark."

The micromirrors in the array can be arranged in many suitable ways. For example, the micromirrors can be arranged such that the center-to-center distance between the adjacent mirror plates can be 10.16 microns or less, such as 4.38 to 10.16 microns. The nearest distance between the edges of the mirror plate can be from 0.1 to 1.5 microns, such as from 0.15 to 0.45 micron, as set forth in U.S. patent application Ser. No. 10/627,302, now U.S. Pat. No. 6,965,468 Ser. No. 10/627,155, now U.S. Pat. No. 7,019,376 and Ser. No. 10/627,303, now U.S. Pat. No. 6,980,347 both to Patel, filed Jul. 24, 2003, the subject matter of each being incorporated herein by reference.

Figure 13:
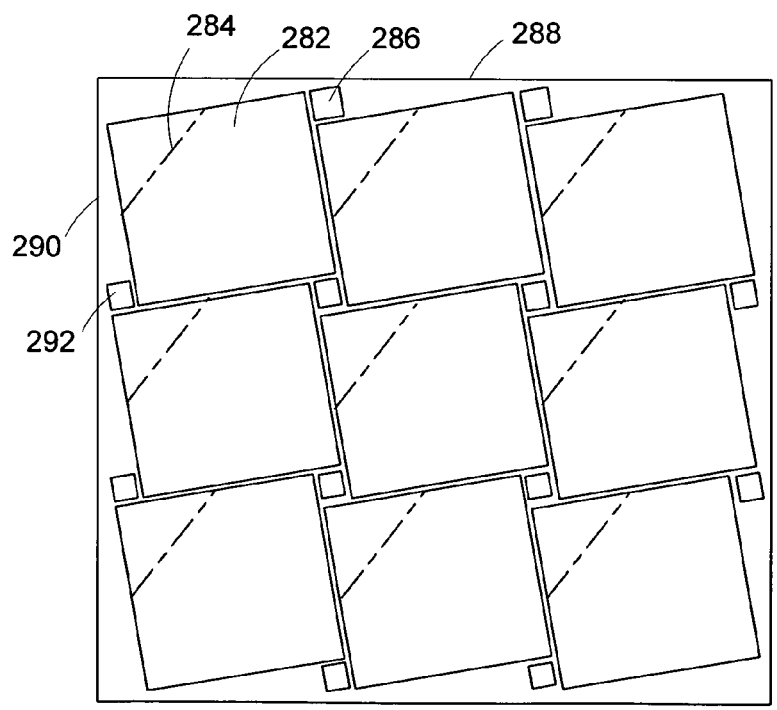
FIG. 13 illustrates a top view of another exemplary spatial light modulator according to another embodiment of the invention.

The micromirrors in the micromirror array of the spatial light modulator can be arranged in alternative ways, another one of which is illustrated in FIG. 13. Referring to FIG. 13, each micromirror is rotated around its geometric center an angle less than 45° degrees. The posts (e.g. 286 and 292) of each micromirror (e.g. mirror 282) are then aligned to the opposite edges of the mirror plate. No edges of the mirror plate are parallel to an edge (e.g. edges 288 or 290) of the micromirror array. The rotation axis (e.g. axis 284) of each mirror plate is parallel to but offset from a diagonal of the mirror plate when viewed from the top of the mirror plate at a non-deflected state.

Figure 14:
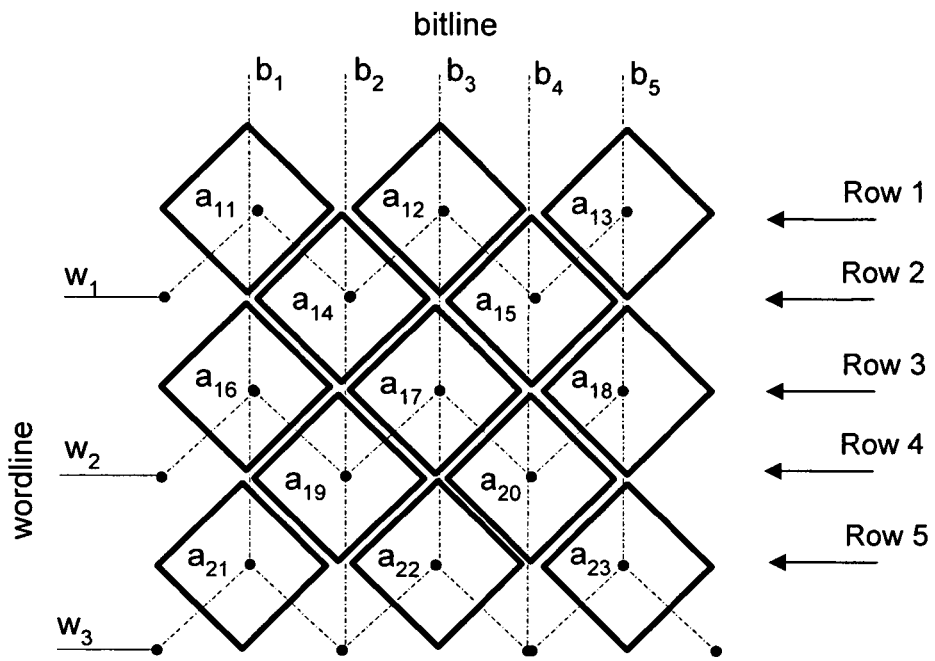
FIG. 14 illustrates a top view of yet another exemplary spatial light modulator according to another embodiment of the invention.

FIG. 14 illustrates the top view of another micromirror array having an array of micromirrors of FIG. 7. In this example, each micromirror is rotated 45° degrees around its geometric center. For addressing the micromirrors, the bitlines and wordlines are deployed in a way such that each column of the array is connected to a bitline but each wordline alternatively connects micromirrors of adjacent rows. For example, bitlines $b_1$, $b_2$, $b_3$, $b_4$, and $b_5$ respectively connect micromirrors groups of ($a_{11}$, $a_{16}$, and $a_{21}$), ($a_{14}$ and $a_{19}$), ($a_{12}$, $a_{17}$, and $a_{22}$), ($a_{15}$ and $a_{20}$), and ($a_{13}$, $a_{18}$, and $a_{23}$). Wordlines $w_1$, $w_2$, and $w_3$ respectively connect micromirror groups ($a_{11}$, $a_{14}$, $a_{12}$, $a_{15}$, and $a_{13}$), ($a_{16}$, $a_{19}$, $a_{17}$, $a_{20}$, and $a_{18}$), and ($a_{21}$, $a_{22}$, and $a_{23}$). With this configuration, the total number of wordlines is less the total number of bitlines.

Figure 15:
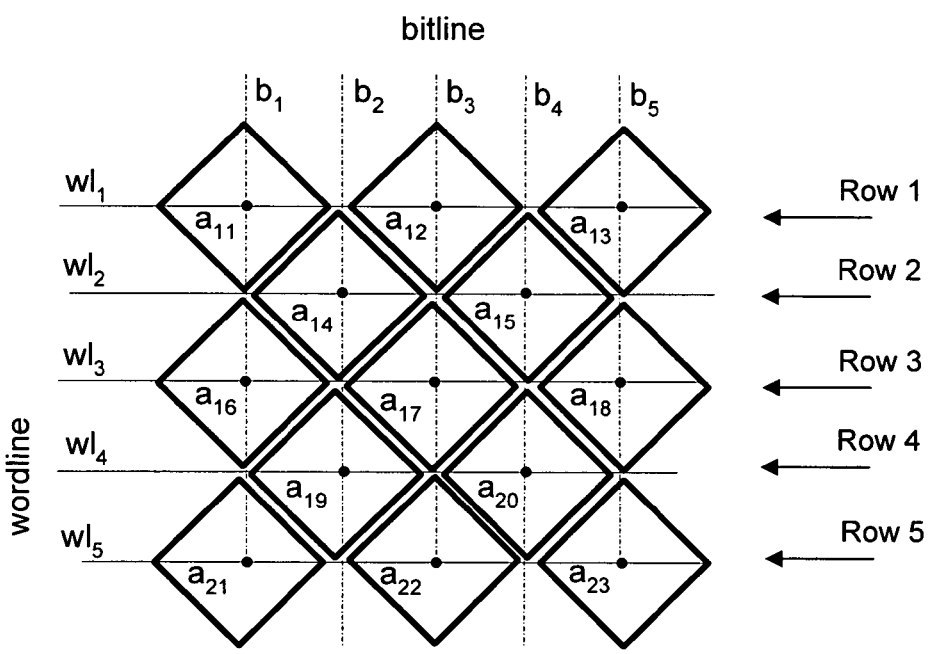
FIG. 15 illustrates a top view of yet another exemplary spatial light modulator according to another embodiment of the invention.

For the same micromirror array, the bitlines and wordlines can be deployed in other ways, such as that shown in FIG. 15. Referring to FIG. 15, each row of micromirrors is provided with one wordline and one bitline. Specifically, bitlines $b_1$, $b_2$, $b_3$, $b_4$ and $b_5$ respectively connect column 1 (comprising micromirrors $a_{11}$, $a_{16}$, and $a_{21}$), column 2 (comprising micromirrors $a_{14}$ and $a_{19}$), column 3 (comprising micromirrors $a_{12}$, $a_{17}$, and $a_{22}$), column 4 (comprising micromirrors $a_{15}$ and $a_{20}$), and column 5 (comprising micromirrors $a_{13}$, $a_{18}$, and $a_{23}$). Wordlines $WL_1$, $WL_2$, $WL_3$, $WL_4$, and $WL_5$ respectively connect row 1 (comprising micromirrors $a_{11}$, $a_{12}$, and $a_{13}$), row 2 (comprising micromirrors $a_{14}$ and $a_{15}$), row 3 (comprising micromirrors $a_{16}$, $a_{17}$, and $a_{18}$), row 4 (comprising micromirrors $a_{19}$ and $a_{20}$) and row 5 (comprising micromirrors $a_{21}$, $a_{22}$, and $a_{23}$).

Figure 16A:
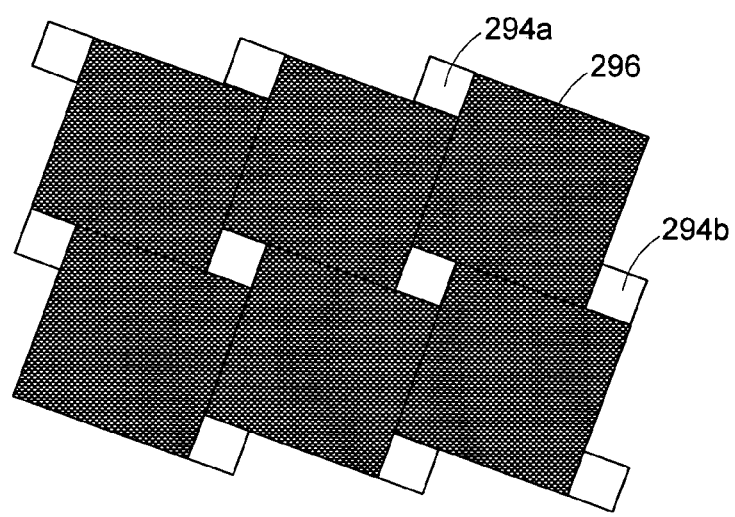
FIG. 16a to FIG. 16c illustrate a top view of yet another exemplary spatial light modulator according to another embodiment of the invention.
Figure 16B:
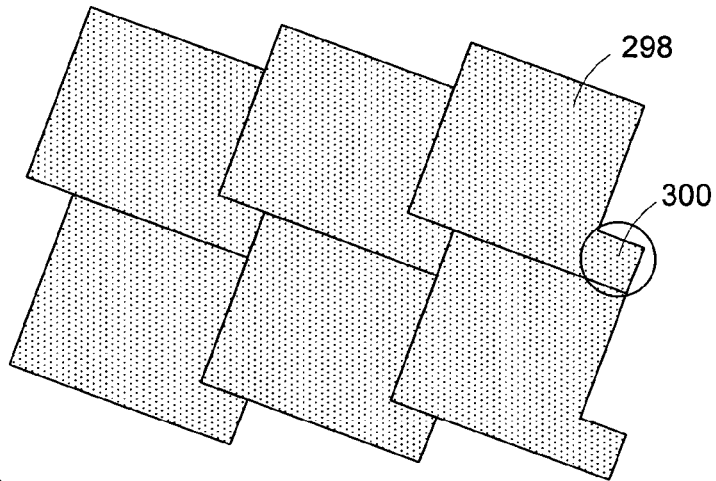
Figure 16C:
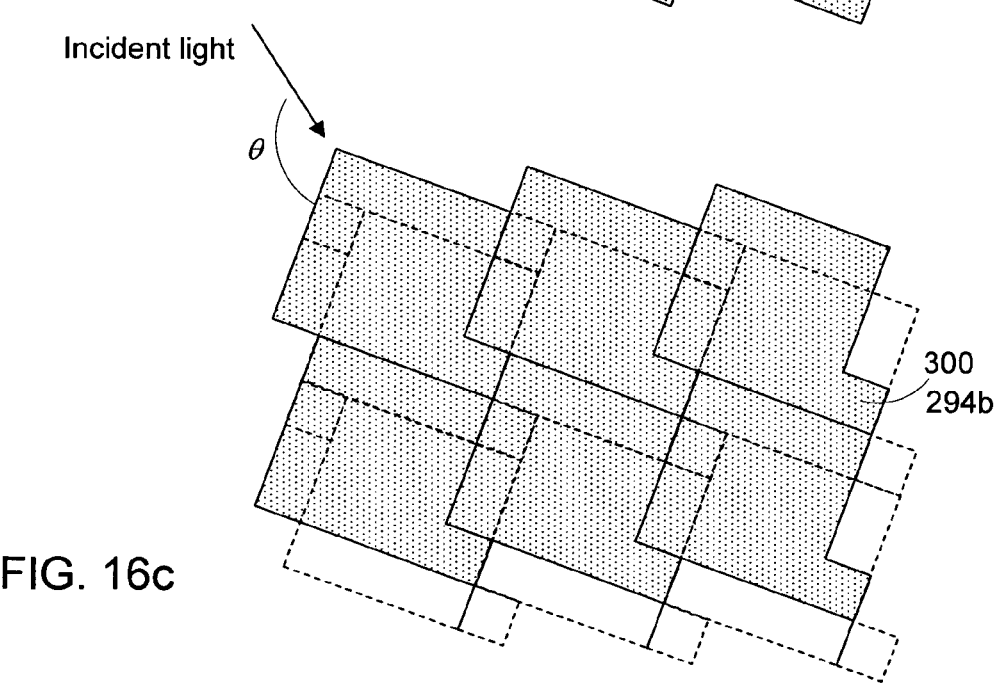

According to another embodiment of the invention, the mirror plates of the micromirrors in the array can form a plurality of pockets, in which posts can be formed, wherein the pockets are covered by the extended areas of the addressing electrodes when viewed from the top of the micromirror array device, as shown in FIGS. 16a to 16c.

Referring to FIG. 16a, a portion of an array of mirror plates of the micromirrors is illustrated therein. The mirror plates in the array form a plurality of pockets in between. For example, pockets 294a and 294b are formed in which posts for supporting and holding mirror plate 296 can be formed. For individually addressing and deflecting the mirror plates in FIG. 16a, an array of addressing electrodes is provided, a portion of which is illustrated in FIG. 16b.

Referring to FIG. 16b, each addressing electrode has an extended portion, such as extended portion 300 of addressing electrode 298. Without the extended portion, the addressing electrode can be generally square, but having an area equal to or smaller than the mirror plate.

FIG. 16c illustrates a top view of a micromirror array device after the addressing electrodes in FIG. 16b and the mirror plates in FIG. 16a being assembled together. It can be seen in the figure that each addressing electrode is displaced a particular distance along a diagonal of the mirror plate associated with the addressing electrode. As a result, the pockets presented between the mirror plates are covered by the addressing electrode, specifically by the extended portions of the addressing electrodes. In this way, light scattering otherwise occurred in the substrate having the addressing electrodes can be removed. The quality, such as the contrast ratio of the displayed images can be improved.

When used in a spatial light modulator of a display system as shown in FIG. 1, the incident light beam is directed onto the mirror plates in a direction along the displacement direction of the addressing electrodes when viewed from the top of the addressing electrodes as shown in the figure. For example, the incident light has an angle θ to an edge of the addressing electrode (or the mirror plate) when viewed from the top; and the angle can be 135° degrees.

Figure 17:
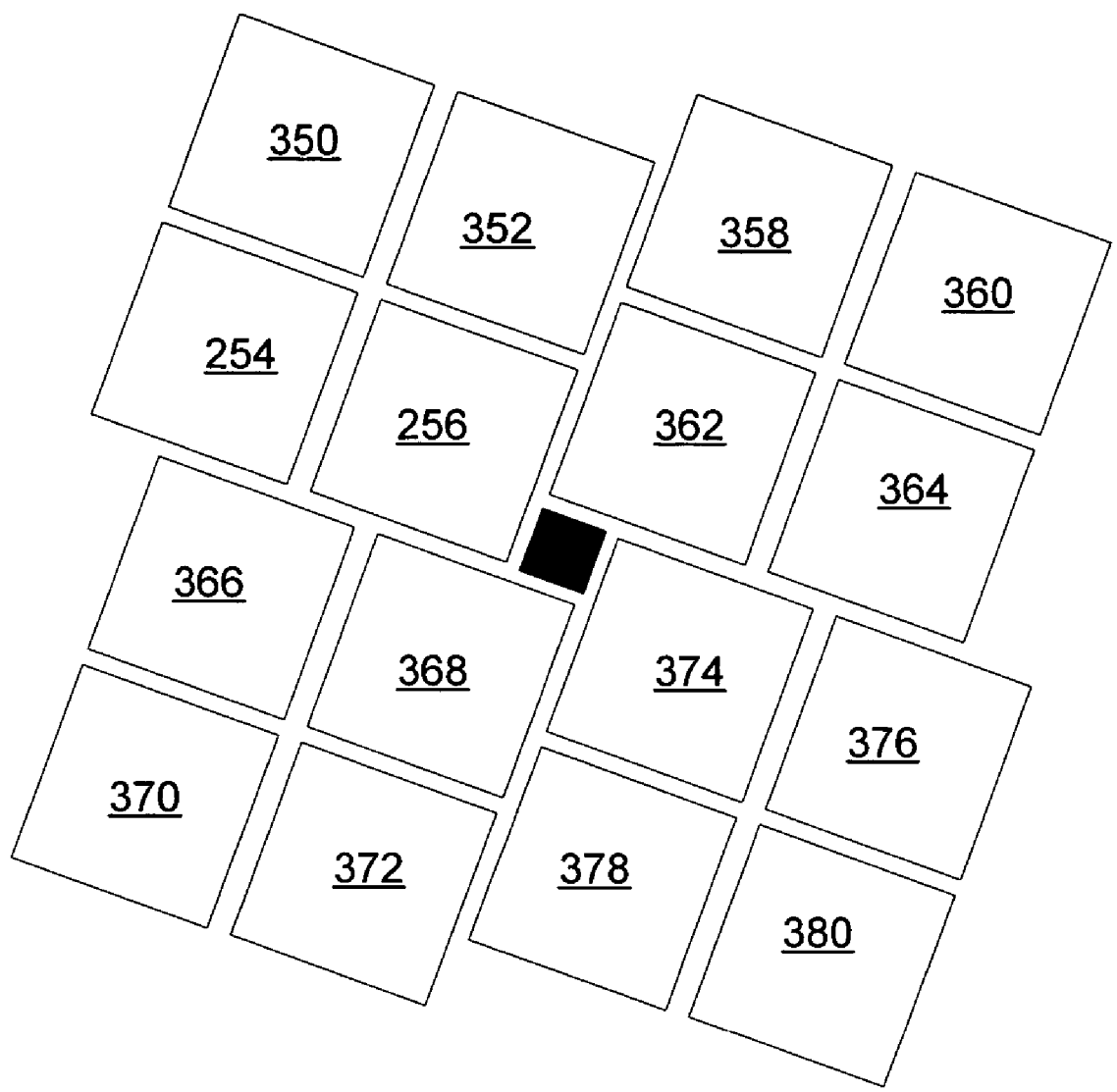
FIG. 17 illustrates a top view of yet another exemplary spatial light modulator according to yet another embodiment of the invention.

In accordance with another embodiment of the invention, not all the micromirror devices of a spatial light modulator have posts (e.g. at that set forth in U.S. patent application Ser. No. 10/969,251 now U.S. Pat. No. 7,092,143 and Ser. No. 10/969,503 now U.S. Pat. No. 7, 158,279 both filed Oct. 19, 2004, the subject matter of each being incorporated herein by reference in entirety. An example of such micromirror array device is illustrated in a top view in FIG. 17. For simplicity purposes, only sixteen micromirror devices of the micromirror array device are illustrated. In this specific example, every four adjacent micromirrors are formed into a micromirror group, such as the group comprising micromirrors 350, 352, 254, and 356, the group comprising 358, 360, 362, and 364, the group comprising micromirrors 366, 368, 370, and 372, and the group comprising micromirrors 374, 376, 378 and 380. Adjacent groups (e.g. the above four micromirror groups) share a post that is represented by the black square for supporting the mirror plates of the micromirrors in the four micromirror groups. The exposed surface of the post can be covered by a light blocking film. In general, the posts of a micromirror array device, wherein not all micromirrors are provided with a post, can all be coated with light blocking pads. Alternatively, only a number of (but not all) the posts are coated with light blocking pads.

Figure 18A:
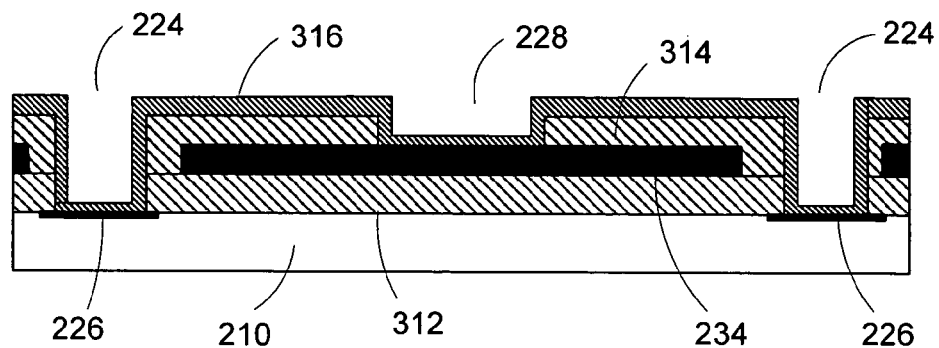
FIG. 18a to 18c are cross-sectional views of a micromirror device in FIG. 5. in an exemplary fabrication process.
Figure 18B:
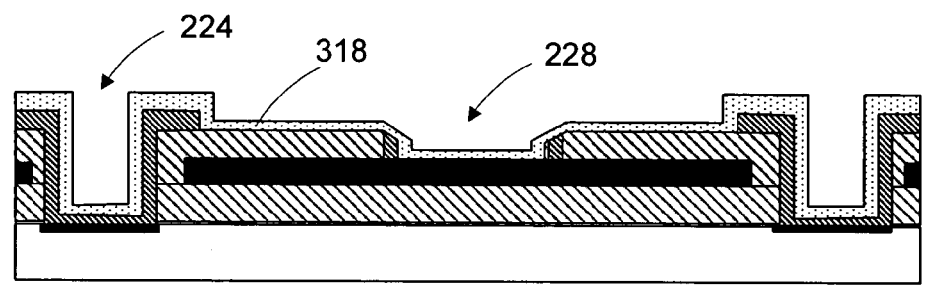
Figure 18C:
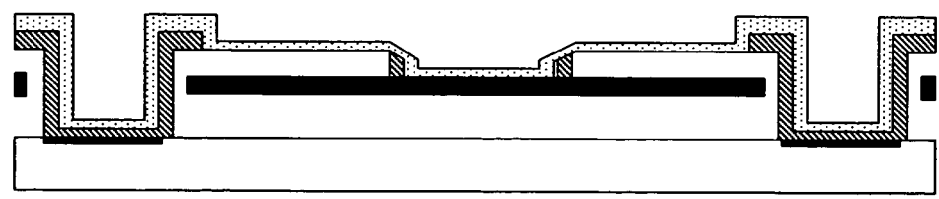

The micromirror as shown as discussed above can be fabricated in many ways, one of which is illustrated in FIGS. 18a to 18c. Referring to FIG. 18a, substrate 210 is provided, which can be glass (e.g. Corning 1737F, Eagle 2000, quartz, Pyrex™, sapphire) that is transparent to visible light. First sacrificial layer 312 is deposited on substrate 210 followed by forming mirror plate 234. First sacrificial layer 312 may be any suitable material, such as amorphous silicon, or could alternatively be a polymer or polyimide, or even polysilicon, silicon nitride, silicon dioxide and tungsten, depending upon the choice of sacrificial materials, and the etchant selected. In the embodiment of the invention, the first sacrificial layer is amorphous silicon, and it is preferably deposited at 300-350°. The thickness of the first sacrificial layer can be wide ranging depending upon the micromirror size and desired title angle of the micro-micromirror, though a thickness of from 500 Å to 50,000 Å, preferably close to 25,000 Å, is preferred. The first sacrificial layer may be deposited on the substrate using any suitable method, such as LPCVD or PECVD.

As an optional feature of the embodiment, an anti-reflection film and/or light transmissive electrode (e.g. electrode 222 in FIG. 7) maybe deposited on the surface of substrate 210. The anti-reflection film is deposited for reducing the reflection of the incident light from the surface of the substrate. Of course, other optical enhancing films may be deposited on either surface of the glass substrate as desired. In addition to the optical enhancing films, an electrode may be formed on a surface of substrate 210. The electrode can be formed as an electrode grid or a series of electrode segments (e.g. electrode strips) around the mirror plate.

Light blocking pads 226 are then deposited followed by patterning on a surface of the glass substrate and at locations corresponding to the surfaces of the posts such that a light blocking pad is disposed between the surface of each of the post and substrate 210.

After patterning the light blocking pads, mirror plate 234 is deposited and patterned on the first sacrificial layer. Because the micromirror is designated for reflecting incident light in the spectrum of interest (e.g. visible light spectrum), it is preferred that the micromirror plate layer comprises of one or more materials that exhibit high reflectivity (preferably 90% or higher) to the incident light. The thickness of the micromirror plate can be wide ranging depending upon the desired mechanical (e.g. elastic modulus), the size of the micromirror, desired ON state angle and OFF state angle, and electronic (e.g. conductivity) properties of the mirror plate and the properties of the materials selected for forming the micromirror plate. According to the invention, a thickness from 500 Å to 50,000 Å, preferably around 2500 Å, is preferred for the mirror plate. In an embodiment of the invention, mirror plate 232 is a multi-layered structure, which comprises a $SiO_x$ layer with a preferred thickness around 400 Å, a light reflecting layer of aluminum with a preferred thickness around 2500 Å, a titanium layer with a preferred thickness around 80 Å, and a 200 Å $TiN_x$ layer. In addition to aluminum, other materials, such as Ag, AlSiCu and TiAl, having high reflectivity to visible light can also be used for the light reflecting layer. These mirror plate layers can be deposited by PVD at a temperature preferably near 150° C.

After deposition, mirror plate 234 is patterned into a desired shape, such as that in FIG. 8 and FIG. 10. The patterning of the micromirror can be achieved using standard photoresist patterning followed by etching using, for example $CF_4$, $Cl_2$, or other suitable etchant depending upon the specific material of the micromirror plate layer.

After patterning the mirror plate, second sacrificial layer 314 is deposited on the mirror plate and first sacrificial layer. The second sacrificial layer may comprise amorphous silicon, or could alternatively comprise one or more of the various materials mentioned above in reference to the first sacrificial layer. First and second sacrificial layers need not be the same, although they are the same in the preferred embodiment so that, in the future, the etching process for removing these sacrificial materials can be simplified. Similar to the first sacrificial layer, the second sacrificial layer may be deposited using any suitable method, such as LPCVD or PECVD. In the embodiment of the invention, the second sacrificial layer comprises amorphous silicon deposited at approximate 350° C. The thickness of the second sacrificial layer can be on the order of 12,000 Å, but may be adjusted to any reasonable thickness, such as between 2,000 Å and 20,000 Å depending upon the desired distance (in the direction perpendicular to the micromirror plate and the substrate) between the micromirror plate and the hinge. It is preferred that the hinge and mirror plate be separated by a gap with a size from 0.1 to 1.5 microns, more preferably from 0.1 to 0.45 micron, and more preferably from 0.25 to 0.45 microns. Larger gaps could also be used, such as a gap from 0.5 to 1.5 micrometers, or from 0.5 to 0.8 micrometer, or from 0.8 to 1.25 micrometers, or from 1.25 to 1.5 micrometers.

In the preferred embodiment of the invention, the micromirror plate comprises aluminum, and the sacrificial layers (e.g. the first and second sacrificial layer) are amorphous silicon. This design, however, can cause defects due to the diffusion of the aluminum and silicon, especially around the edge of the mirror plate. To solve this problem, a protection layer (not shown) maybe deposited on the patterned micromirror plate before depositing the second sacrificial silicon layer such that the aluminum layer can be isolated from the silicon sacrificial layer. This protection may or may not be removed after removing the sacrificial materials. If the protection layer is not to be removed, it is patterned after deposition on the mirror plate.

The deposited second sacrificial layer is then patterned for forming two deep-via areas 224 and shallow via area 228 using standard lithography technique followed by etching, as shown in the figure. The etching step may be performed using $Cl_2$, $BCl_3$, or other suitable etchant depending upon the specific material(s) of the second sacrificial layer. The distance across the two deep-via areas depends upon the length of the defined diagonal of the micromirror plate. In an embodiment of the invention, the distance across the two deep-via areas after the patterning is preferably around 10 μm, but can be any suitable distance as desired. In order to form the shallow-via area, an etching step using $CF_4$ or other suitable etchant may be executed. The shallow-via area, which can be of any suitable size, is preferably on the order of 2.2 square microns. And the size of each deep-via is approximate 1.0 micron.

After patterning the second sacrificial layer, hinge structure layer 316 is deposited on the patterned second sacrificial layer. Because the hinge structure is designated for holding the deformable hinge and the micromirror plate, it is desired that the hinge structure layer comprises of materials having at least large elastic modulus. According to an embodiment of the invention, hinge structure layer 316 comprises a 400 Å thickness of $TiN_x$ (although it may comprise $TiN_x$, and may have a thickness between 100 Å and 2000 Å) layer deposited by PVD, and a 3500 Å thickness of $SiN_x$ (although the thickness of the $SiN_x$ layer may be between 2000 Å and 10,000 Å) layer 350 deposited by PECVD. Of course, other suitable materials and methods of deposition may be used (e.g. methods, such as LPCVD or sputtering). The $TiN_x$ layer is not necessary for the invention, but provides a conductive contact surface between the micromirror and the hinge in order to, at least, reduce charge-induced stiction.

After the deposition, hinge structure layer 316 is patterned into a desired configuration, such as hinge structure 260 in FIG. 10. An etching step using one or more proper etchants is executed in patterning the hinge structure layer. In particular, the layer can be etched with a chlorine chemistry or a fluorine chemistry where the etchant is a perfluorocarbon or hydrofluorocarbon (or $SF_6$) that is energized so as to selectively etch the hinge support layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge support layer (e.g. chlorine chemistry for a metal layer, hydrocarbon or fluorocarbon (or $SF_6$) plasma for silicon or silicon compound layers, etc.).

Referring to FIG. 18b, after patterning the hinge structure layer, the bottom segment of contact area 228 is removed and part of the micromirror plate underneath the contact area is thus exposed to hinge layer 318, which is deposited on the patterned hinge structure layer, to form an electric-contact with external electric source. The sidewalls of contact area 228 are left with residues of the hinge structure layers after patterning. The residue on the sidewalls helps to enhance the mechanical and electrical properties of the hinge. Each of the two deep-via areas 224 on either side of the mirror can form a continuous element with the deep-via areas corresponding to the adjacent micromirror in an array. The surfaces (the contacting surfaces of the posts to substrate 210) of the posts are covered by the light blocking pads 226.

In the embodiment of the invention, the hinge layer is also used as an electric contact for the micromirror plate. It is desired that the material of the hinge layer is electrically conductive. Examples of suitable materials for the hinge layer are silicon nitride, silicon oxide, silicon carbide, polysilicon, Al, Ir, titanium, titanium nitride, titanium oxide(s), titanium carbide, $CoSiN_x$, $TiSiN_x$, $TaSiN_x$, or other ternary and higher compounds. When titanium is selected for the hinge layer, it can be deposited at 100° C. Alternatively, the hinge layer may comprise of multi-layers, such as 100 Å $TiN_x$ and 400 Å $SiN_x$.

After deposition, the hinge layer is then patterned as desired using etching. Similar to the hinge structure layer, the hinge layer can be etched with a chlorine chemistry or a fluorine chemistry where the etchant is a perfluorocarbon or hydrofluorocarbon (or $SF_6$) that is energized so as to selectively etch the hinge layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge layer (e.g. chlorine chemistry for a metal layer, hydrocarbon or fluorocarbon (or $SF_6$) plasma for silicon or silicon compound layers, etc.).

After the hinge is formed, the micromirror is released by removing the sacrificial materials of the first and second sacrificial layers, a cross-sectional view of which is presented in FIG. 18c.

In the example as discussed above, the light blocking pads are formed before depositing the first sacrificial layer and other members (e.g. the mirror plate and hinge) of the micromirror. Alternatively, the light blocking pads can be formed during the fabrication of the posts. For example, instead of forming the light blocking pads before depositing first sacrificial layer 312 in FIG. 18a and FIG. 18b, a light blocking layer can be deposited after patterning the second sacrificial layer (314) (which step forms post areas 224 in FIG. 18a) but before depositing hinge supporting layer 316. The light blocking layer then filled the patterned area including the bottom surface of post areas 224 in FIG. 18a. The deposited light blocking layer can then be patterned followed by the steps of depositing and patterning the hinge support layer 316 and other consequent steps. Alternatively, patterning of the deposited light blocking layer can be performed along with the patterning of the hinge supporting layer 316.

In order to efficiently remove the sacrificial material (e.g. amorphous silicon), the release etching utilizes an etchant gas capable of spontaneous chemical etching of the sacrificial material, preferably isotropic etching that chemically (and not physically) removes the sacrificial material. Such chemical etching and apparatus for performing such chemical etching are disclosed in U.S. patent application Ser. No. 09/427,841 to Patel et al. filed Oct. 26, 1999, now U.S. Pat. No. 6,290,864 and in U.S. patent application Ser. No. 09/649,569 to Patel at al. filed Aug. 28, 2000, now U.S. Pat. No. 6,949,202 the subject matter of each being incorporated herein by reference. Preferred etchants for the release etch are gas phase fluoride etchants that, except for the optional application of temperature, are not energized. Examples include HF gas, noble gas halides such as xenon difluoride, and interhalogens such as $IF_5$, $BrCl_3$, $BrF_3$, $IF_7$ and $ClF_3$. The release etch may comprise inner gas components such as ($N_2$, Ar, Xe, He, etc.). In this way, the remaining sacrificial material is removed and the micromechanical structure is released. In one aspect of such an embodiment, $XeF_2$ is provided in an etching chamber with diluents (e.g. $N_2$ and He). The concentration of $XeF_2$ is preferably 8 Torr, although the concentration can be varied from 1 Torr to 30 Torr or higher. This non-plasma etch is employed for preferably 900 seconds, although the time can vary from 60 to 5000 seconds, depending on temperature, etchant concentration, pressure, quantity of sacrificial material to be removed, or other factors. The etch rate may be held constant at 18 Å/s/Torr, although the etch rate may vary from 1 Å/s/Torr to 100 Å/s/Torr. Each step of the release process can be performed at room temperature.

In addition to the above etchants and etching methods mentioned for use in either the final release or in an intermediate etching step, there are others that may also be used by themselves or in combination. Some of these include wet etches, such as ACT, KOH, TMAH, HF (liquid); oxygen plasma, $SCCO_2$, or super critical $CO_2$ (the use of super critical $CO_2$ as an etchant is described in U.S. patent application Ser. No. 10/167,272, now U.S. Pat. No. 6,958, 123 which is incorporated herein by reference). However, spontaneous vapor phase chemical etchants are more preferred, because the sacrificial material, such as amorphous silicon within small spaces, and small gap can be efficiently removed via gaps between adjacent mirror plates and the lateral gap as compared to other sacrificial materials (e.g. organic materials) and other etching methods. Though not required in all embodiments of the present invention, a micromirror array with a small gap, a small pitch and a small distance between the hinge and the mirror plate can thus be more easily fabricated with such spontaneous vapor phase chemical etchants, as set forth in US patent application Ser. No. 10/627,155 filed Jul. 24, 2003, Ser. No. 10/666,671 filed Sep. 17, 2003, and Ser. No. 10/666,002 filed Sep. 17, 2003, now U.S. Pat. No. 7,027,200 the subject matter of each being incorporated herein by reference.

It will be appreciated by those skilled in the art that a new and useful micromirror array device having light blocking pads have been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention.

I claim:

1. A method of making a micromirror array device, comprising:
   providing a substrate;
   forming an array of light blocking pads on the substrate;
   depositing a sacrificial material on the substrate;
   forming an array of mirror plates and hinges on the sacrificial material and an array of posts extending from the hinges to the substrate with at least one of the posts being supported by one of the light blocking pads; and
   removing the sacrificial material such that the mirror plates are movable relative to the substrate.

2. The method of claim 1, wherein the light blocking pads are formed before depositing the sacrificial material.

3. The method of claim 2, further comprising:
   depositing a layer of a light blocking material on the substrate; and
   patterning the deposited light blocking layer into the light blocking pads at locations each of which corresponds to one of the surfaces of the posts.

4. The method of claim 3, wherein the sacrificial material is deposited on the patterned light blocking pads.

5. The method of claim 1, wherein the light blocking pads are formed after depositing the sacrificial material and during the step of forming the posts that further comprises:
   patterning the deposited sacrificial material so as to form a plurality of post areas;
   depositing the light blocking material on the patterned sacrificial material;
   patterning the deposited sacrificial material such that the bottom surface of at least one of the posts areas is covered by the light blocking material.

6. The method of claim 5, wherein the sacrificial material is deposited as first and second sacrificial layers; wherein the mirror plates are formed on the first sacrificial layer; wherein the second sacrificial layer is deposited on the formed mirror plates; wherein the hinges are formed on the deposited sacrificial material; and wherein the posts are formed after depositing and patterning of the second sacrificial layer.

7. The method of claim 5, wherein at least one of the post areas has a wall that has the sacrificial material.

8. The method of claim 1, wherein the step of removing the sacrificial material comprises:
   removing the sacrificial material using a spontaneous vapor phase etchant.

9. The method of claim 8, wherein the etchant comprises a noble gas halide.

10. The method of claim 9, wherein the noble gas halide comprises a xenon difluoride.

11. The method of claim 8, wherein the etchant comprises an interhalogen.

12. The method of claim 8, wherein the etchant comprises HF.

13. The method of claim 8, wherein the etchant comprises a diluent gas.

14. The method of claim 13, wherein the diluent gas is an inert gas.

15. A micromirror array device, comprising:
a substrate;
an array of light blocking pads on the substrate;
an array of mirror plates attached to an array of hinges; and
an array of posts extending from the hinges to the substrate with at least one of the posts being supported by one of the light blocking pads.

16. The device of claim 15, wherein the substrate is a glass.

17. The device of claim 15, wherein the substrate is a quartz.

18. The device of claim 15, wherein the mirror plates are derived from a single crystal.

19. The device of claim 18, wherein the single crystal is a single crystal silicon.

20. The device of claim 15, wherein the mirror plates and hinges are formed in the same plane.

21. The device of claim 15, wherein the light blocking pads each comprise a light blocking material that comprises a light absorbing material that absorbs 85% or more of the incident light.

22. The device of claim 21, wherein the light blocking material comprises a light absorbing material that absorbs 90% or more of the incident light.

23. The device of claim 21, wherein the light absorbing material comprises chromium.

24. The device of claim 21, wherein the light absorbing material comprises chromium oxide.

25. The device of claim 21, wherein the light absorbing material comprises nickel.

26. The device of claim 21, wherein the light absorbing material comprises a material that is selected from the group consisting of $CrN_x$, $TiAl_x$, and $TaN_x$.

27. The device of claim 21, wherein the light absorbing material comprises $CN_x$, $CAl_xN_y$, or $CTi_xN_y$.

28. The device of claim 21, wherein the light absorbing material comprises $SiC_x$.

29. The device of claim 21, wherein the light absorbing material comprises WC.

30. The device of claim 21, wherein the light absorbing material comprises TiAlCN.

31. The device of claim 21, wherein the light absorbing material comprises a TiC layer and WC layer.

32. The device of claim 21, wherein the light absorbing material comprises a C layer and WC layer.

33. The device of claim 21, wherein the light absorbing material comprises a TiAlN layer, a WC layer, and a C layer.

34. The device of claim 15, wherein the light blocking pads each comprise a light absorbing material that absorbs 99% or more of the incident light.

35. The device of claim 15, wherein the light blocking pads each comprise a light reflecting layer that reflects 85% or more of the incident light.

36. The device of claim 35, wherein the light reflecting layer comprises a silver layer.

37. The device of claim 35, wherein the light reflecting layer comprises a gold layer.

38. The device of claim 35, wherein the light reflecting layer comprises an aluminum layer.

39. The device of claim 15, wherein the light blocking pads each comprise a light reflecting layer that reflects 90% or more of the incident light.

40. The device of claim 15, further comprising:
an optical film on the substrate that is a light transmissive substrate for adjusting an optical property of the light transmissive substrate.

41. The device of claim 40, wherein the optical film comprises:
an electrically conductive layer that is transmissive to the visible light.

42. The device of claim 41, wherein the optical film further comprises:
an electrically non-conductive layer that is transmissive to the visible light.

43. The device of claim 41, wherein the electrically conductive layer comprises an indium-tin-oxide layer.

44. The device of claim 42, wherein the electrically non-conductive layer comprises a $SiO_x$ layer.

45. The device of claim 42, wherein the electrically non-conductive layer comprises a $TiO_x$ layer.

46. The device of claim 42, wherein the electrically non-conductive layer comprises a $NbO_x$ layer.

47. The device of claim 15, wherein the substrate is a light transmissive substrate that further comprises an anti-reflection layer.

48. The device of claim 15, wherein not all of the surfaces of the posts contact the light blocking pads.

49. The device of claim 15, wherein all of the surfaces of the posts are covered by a light blocking or absorbing material.

50. The device of claim 15, wherein not all mirror plates are held on the substrate by a post.

51. The device of claim 15, wherein the light blocking pad has a shape of square.

52. The device of claim 15, wherein each mirror plate is attached to one of the array of hinges via hinge contact.

53. The device of claim 52, wherein the hinge contact contacts the mirror plate at a location offset away from the geometric center of the mirror plate.

54. The device of claim 53, wherein the hinge contact contacts the mirror plate at a location substantially around the geometric center of the mirror plate.

55. The device of claim 15, further comprising:
an array of addressing electrodes positioned proximate to the mirror plates for addressing and deflecting the mirror plates.

56. The device of claim 55, wherein each mirror plate is associated with only one of the addressing electrodes.

57. The device of claim 15, wherein the mirror plates are formed such that a geometric center-to-center distance between adjacent mirror plates is 10.16 microns or less.

58. The device of claim 15, wherein the mirror plates are formed such that a geometric center-to-center distance between adjacent mirror plates is from 4.38 to 10.16 microns.

* * * * *